United States Patent [19]

Ramchandran et al.

[11] Patent Number: 5,267,021
[45] Date of Patent: Nov. 30, 1993

[54] MULTIRESOLUTION DIGITAL TELEVISION BROADCAST SYSTEM

[75] Inventors: Kannan Ramchandran, Belle Harbor, N.Y.; Kamil M. Uz, Plainsboro, N.J.; Martin F. Vetterli, New York, N.Y.

[73] Assignee: The Trustees of Columbia University in the City of New York, New York, N.Y.

[21] Appl. No.: 862,979

[22] Filed: Apr. 3, 1992

[51] Int. Cl.[5] .................... H04N 11/06; H04N 5/38
[52] U.S. Cl. .................... 358/12; 358/186; 375/39
[58] Field of Search ............ 358/141, 142, 186, 12; 375/39

[56] References Cited

U.S. PATENT DOCUMENTS

| | | | |
|---|---|---|---|
| 4,520,490 | 5/1985 | Wei | 375/27 |
| 4,641,179 | 2/1987 | Lo Cicero et al. | 358/12 |
| 5,029,185 | 7/1991 | Wei | 375/39 |
| 5,105,442 | 4/1992 | Wei | 358/13 |
| 5,105,443 | 4/1992 | Betts et al. | 375/39 |

OTHER PUBLICATIONS

W. Schreiber, "Considerations in the Design of HDTV Systems for Terrestrial Broadcasting," *Electronic Imaging*, Oct. 1990.

"Digital Spectrum Compatible HDTV System," AT&T/Zenith Technical Report, Sep. 1991.

"Advanced Digital Television: System Description," Sarnoff/NBC/Philips/Thomson Technical Report, Feb. 1991.

T. Cover, "Broadcast Channels," *IEEE Transactions on Information Theory*, vol. IT-18, pp. 2-14, Jan. 1972.

W. Schreiber, "All-Digital HDTV Terrestrial Broadcasting in the U.S.: Some Problems and Possible Solutions," *Workshop on Advanced Television*, ENST, Paris May 1991.

*Primary Examiner*—John K. Peng
*Attorney, Agent, or Firm*—Brumbaugh, Graves, Donohue & Raymond

[57] ABSTRACT

In a digital TV broadcast system, an embedded multiresolution scheme implementing joint source/channel coding is employed to offer at least relatively fine and relatively coarse resolution services. The relatively fine resolution service is intended for receivers within a first radius of a TV signal transmitter and the relatively coarse resolution service is intended for receivers between the first radius and a second, longer radius thereof. Video signals broadcast from the transmitter represent individual signal points which are selected from a signal constellation. The latter comprises signal-point groups each including a multiplicity of the signal points. The selected signal points represent video images in the relatively fine resolution, while the signal-point groups from which the selected signal points originate represent the relatively coarse version of the images. The relative length of the first radius to the second radius is a function of the ratio of the interdistance of two neighboring signal points within a signal-point group to the interdistance of two neighboring signal-point groups in the signal constellation.

34 Claims, 9 Drawing Sheets

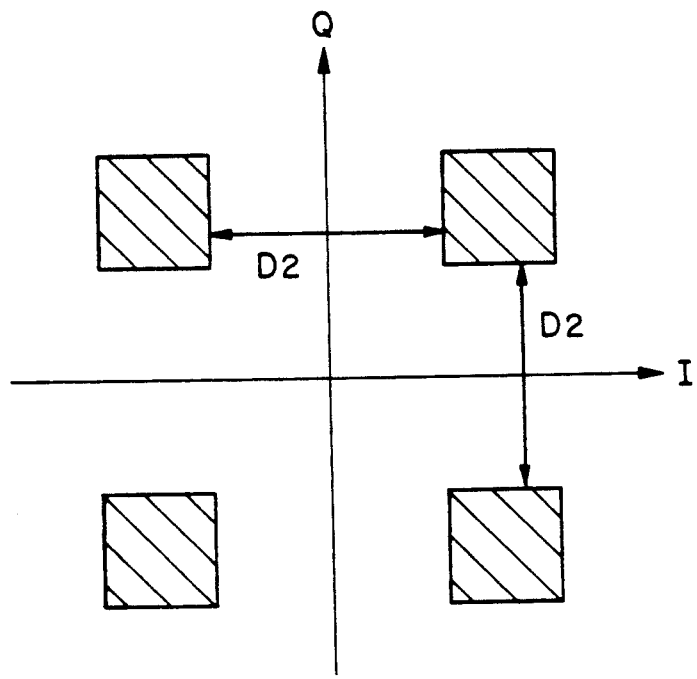
FIG. 7A
| | Rf/Rc |
|---|---|
| L=0.1 | 0.13 |
| L=0.2 | 0.25 |
| L=0.5 | 0.6 |
| L=1 | 1 |
FIG. 8
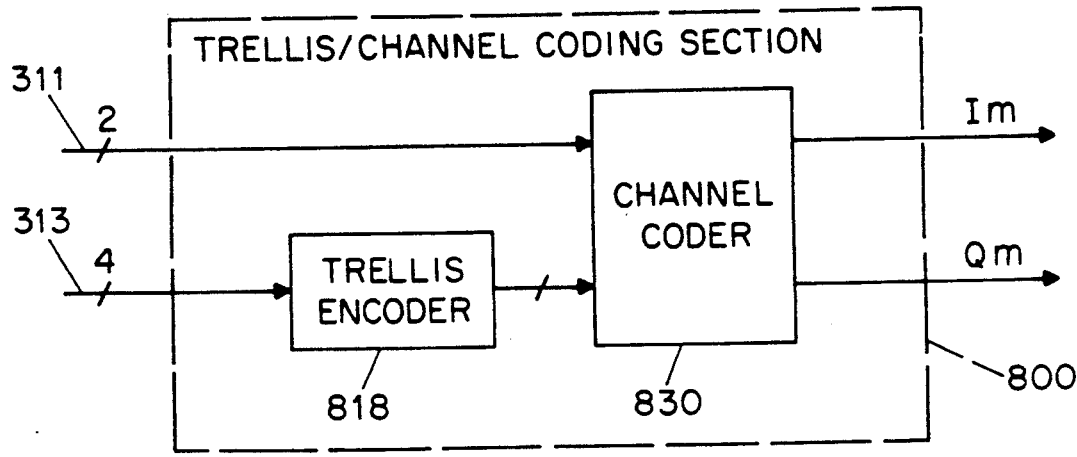
FIG. 9

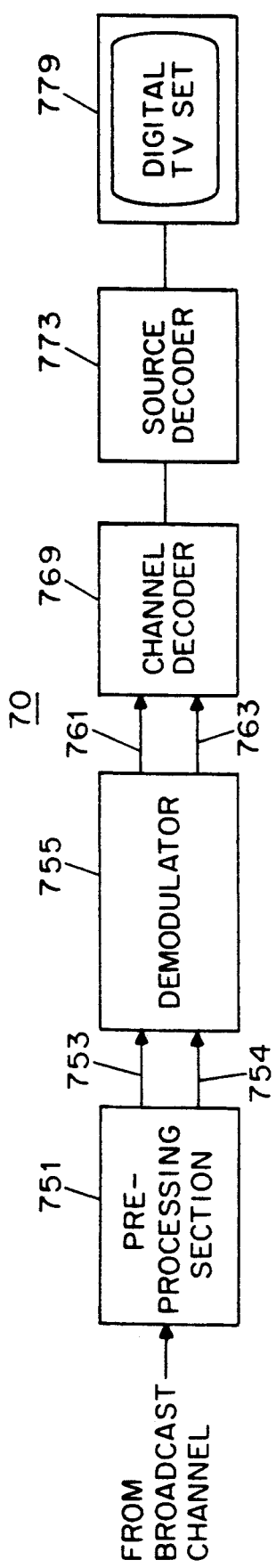
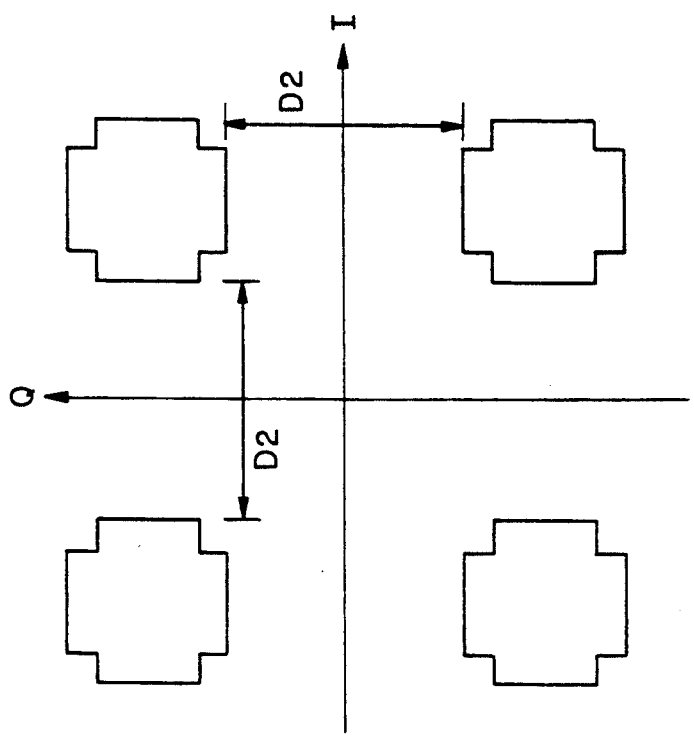
FIG. 11
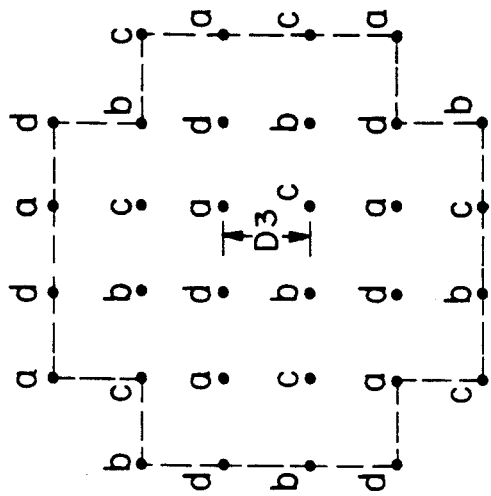
FIG. 10
FIG. 7B

MULTIRESOLUTION DIGITAL TELEVISION BROADCAST SYSTEM

TECHNICAL FIELD

This invention relates to digital transmission and, more particularly, to joint source/channel coding for digital video broadcast systems.

BACKGROUND OF THE INVENTION

Recent advances in video compression technology have spurred significant interest in the are of high definition television (HDTV) involving digital broadcast. As a result, much literature each been published regarding same. For example, in the paper by W. Schreiber, "Considerations in the Design of HDTV Systems for Terrestrial Broadcasting," *Electronic Imaging*, October 1990, it is pointed out that if the digital broadcast is implemented with a single resolution scheme as in the present terrestrial broadcast, the broadcast bandwidth would be underutilized for areas close to a signal transmitter. This stems from the fact that the power of a transmitted signal appearing at a receiver decreases with its distance from the transmitter, while the noise corrupting the signal remains virtually unchanged with the distance. As such, receivers closer to the transmitter are provided with signals of a higher carrier-to-noise ratio (CNR) (which is, as is well-known, a measure of the relative average power of a carrier signal to its accompanying noise) and thus a lower probability of recovery errors. Therefore, in providing the same HDTV quality within a coverage area, the required bandwidth for the receivers close to the transmitter need not be as much as for those relatively far therefrom.

Another problem with the single resolution scheme coupled with the digital technology is its failure to provide a moderate degradation beyond the intended coverage area. That is, due to design limitations, a signal transmitted from a digital, single resolution system would normally have too low a CNR for a receiver beyond the intended coverage area to recover even a degraded signal.

Attempts have been made to solve the aboveidentified problems with the single resolution scheme. One such attempt involves the use of a multiresolution (MR) scheme as proposed in: "Digital Spectrum Compatible HDTV System," AT&T Zenith Technical Report, September 1991. In accordance with this proposal, two video signals of different bit-rates ar transmitted for two different coverage areas in a time division multiplexed manner. The signal of a higher bit rate offering a relatively fine resolution is intended for receivers close to the transmitter in a first coverage area, and the signal of the relatively low bit rate offering relatively coarse resolution is intended for receivers in the second, farther coverage area, thereby achieving a moderate transition of TV quality between the first and second coverage areas.

Another MR scheme, which is proposed in: "Advanced Digital Television: System Description," Sarnoff/NBC/Philips/Thomson Technical Report, February, 1991, calls for bit prioritization in its coding scheme and frequency division multiplexed transmission. However, as pointed out in: T. Cover, "Broadcast Channels," *IEEE Transactions on Information Theory*, vol. IT-18, pp. 2–14, January 1972, the multiplexed schemes, be it frequency division or time division, are less desirable in terms of bandwidth efficiency for communicating different information simultaneously to different receivers, compared with an embedded scheme where a signal containing the composite information to be decoded by different receivers.

Still another MR scheme focusing on spectral efficiency, which is described in: W. Schreiber, "All-digital HDTV Terrestrial Broadcasting in the U.S.: Some Problems and Possible Solutions," *Workshop on Advanced Television*, ENST, Paris, May 1991, calls for hybrid analog-over-digital transmission. The latter scheme is however not completely digital and therefore cannot take full advantage of the digital compression technology.

SUMMARY OF THE INVENTION

In accordance with the invention, a digital TV broadcast system implements an MR scheme in which a transmitter broadcasts video images in at least relatively fine and relatively coarse resolutions. The system employs a signal constellation comprising a number of signal-point groups each including a multiplicity of signal points. Any two neighboring signal points within one such signal-point group are separated by a first distance, and any two neighboring signal-point groups in the constellation are separated by a second distance. Images in the relatively fine resolution are represented by signal points which are selected from the signal constellation. The signal-point groups from which the signal points are selected represent the relatively coarse version of the images. The images in the relatively fine resolution are intended for receipt within a first radius of the transmitter, and the relatively coarse version thereof is intended for receipt between the first radius and a second, longer radius of same. The relative length of the first radius to the second radius is a function of the ratio of the first distance to the second distance.

Unlike the prior art systems, the present system employs an embedded MR scheme in which the two resolutions are not represented by two types of video signals which are transmitted in a time or frequency division multiplexed manner. Rather, it transmits only one type of video signal containing the composite information for the fine and coarse resolutions, and this embedded scheme is achieved by performing joint source/channel coding on the video signal transmitted. Advantageously, a TV broadcast system in accordance with the invention realizes efficient utilization of the broadcast bandwidth and affords a stepwise degradation from a relatively fine resolution service to a relatively coarse resolution service. Moreover, the inventive system is all digital and can therefore take full advantage of advanced digital technologies including digital compression and coding schemes.

BRIEF DESCRIPTION OF THE DRAWING

In the drawing,

FIG. 7A is a signal constellation used in a simplified receiver providing a TV service of the first quality in accordance with the invention;

FIG. 7B is a block diagram of the simplified receiver in accordance with the invention;

FIG. 8 is a table showing the relationship between two ratios for manipulating the relative coverage area of the first quality service to the second quality service in accordance with the invention;

FIG. 9 is a block diagram of a coding section incorporating trellis coded modulation which may be used in the transmitter of FIG. 3;

FIG. 10 is a second signal constellation whose translated versions are used as signal-point groups in a third signal constellation for a digital TV broadcast system incorporating trellis coded modulation in accordance with the invention;

FIG. 11 is the third signal constellation for the trellis coded modulation in accordance with the invention;

Throughout the figures of the drawing, the same reference numerals and characters are used to denote like features, elements, components or portions of the illustrated system.

DETAILED DESCRIPTION

Figure 1:
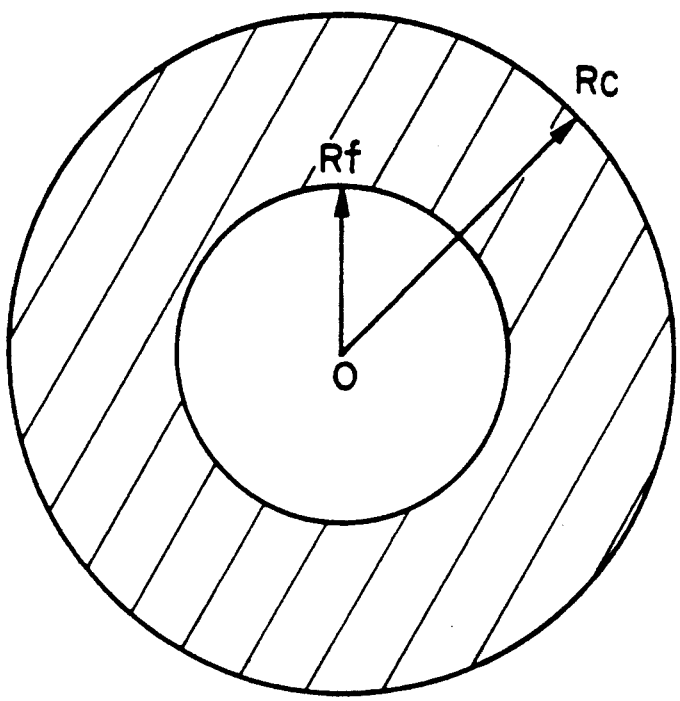
FIG. 1 illustrates areas receiving TV services of first and second qualities provided by a digital TV broadcast system in accordance with the invention.
Figure 2:
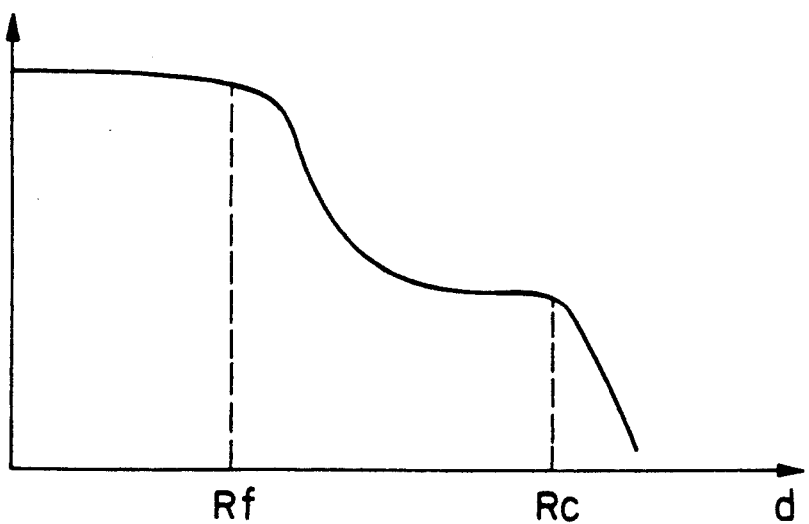
FIG. 2 is a plot of the distance from a transmitter of the digital TV broadcast system versus its service quality.

The digital TV broadcast system in the present embodiment implements an MR scheme, and it is, illustratively, a two resolution system. This system, in particular, provides two grades of TV service which are respectively of (a) fine resolution, i.e., with HDTV quality and (b) coarse resolution, i.e., with inferior but acceptable quality. As to be described, unlike the prior art systems discussed above, the present system employs an embedded MR scheme wherein the two resolutions are not represented by two types of video signals which are transmitted in a time or frequency division multiplexed manner. Rather, it transmits only one type of video signal containing the composite information for the fine and coarse resolutions, and this embedded scheme is achieved by performing joint source/channel coding on the video signal to be transmitted. FIG. 1 illustrates the coverage areas corresponding to the respective services offering fine and coarse resolutions. Specifically FIG. 1 shows two concentric circles having a center O marking the location of the transmitter of the system, which is to be described. The unshaded area enclosed by the circle having a radius Rf represents a first coverage area, and the shaded area between that circle and the other circle having a radius Rc represents a second coverage area. In accordance with the present scheme, the first coverage area which is relatively close to the transmitter receives the fine resolution service and the second coverage area receives the coarse resolution service. FIG. 2 is a plot of service quality (in arbitrary units) versus a distance, d, from the transmitter. As shown in FIG. 2, the service quality received by a receiver between O and Rf is relatively high, compared with that between Rf and Rc. In addition, the service quality is drastically reduced beyond Rc.

Figure 3:
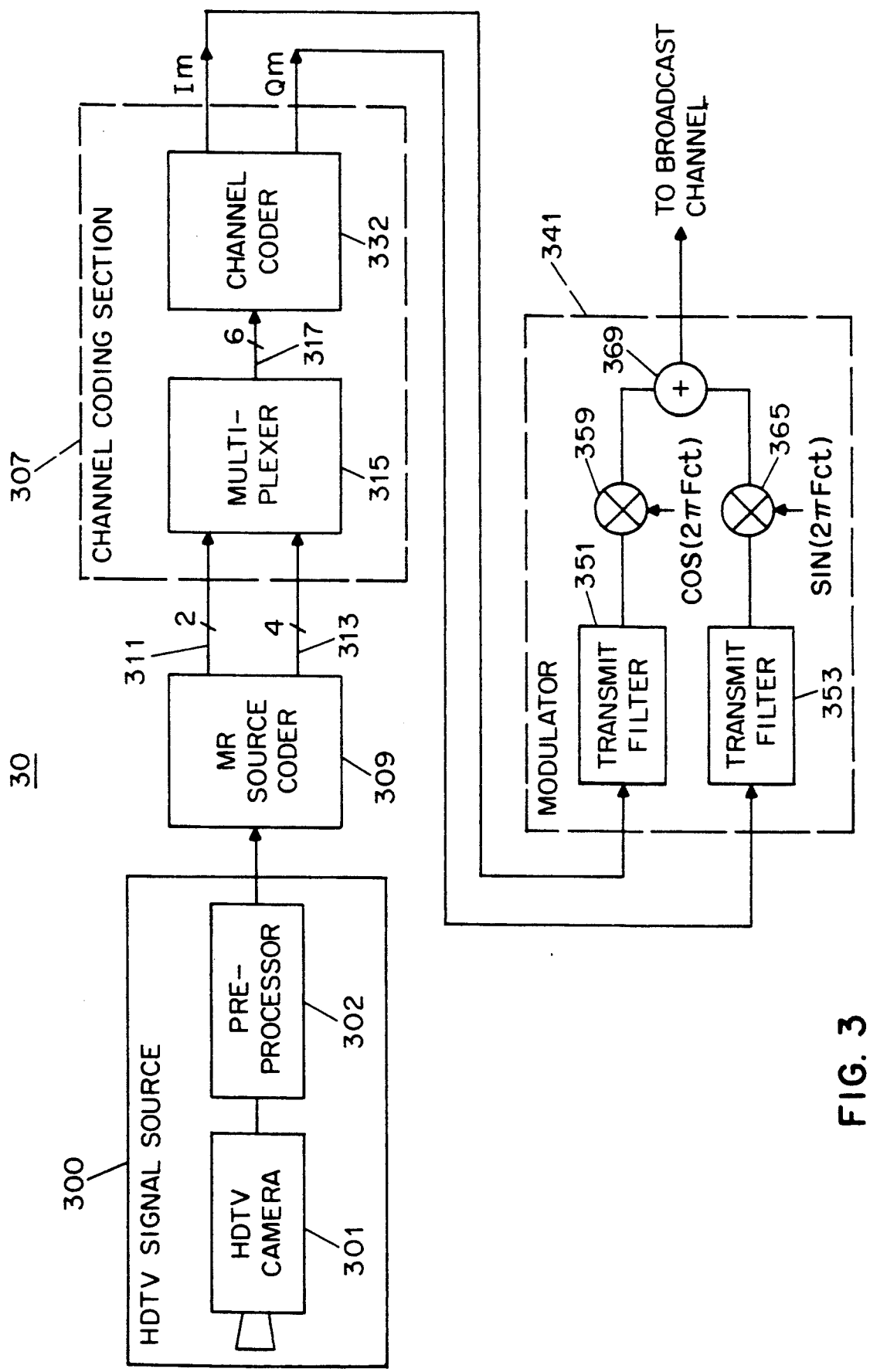
FIG. 3 is a block diagram of the transmitter of the digital TV broadcast system in accordance with the invention.
Figure 4A:
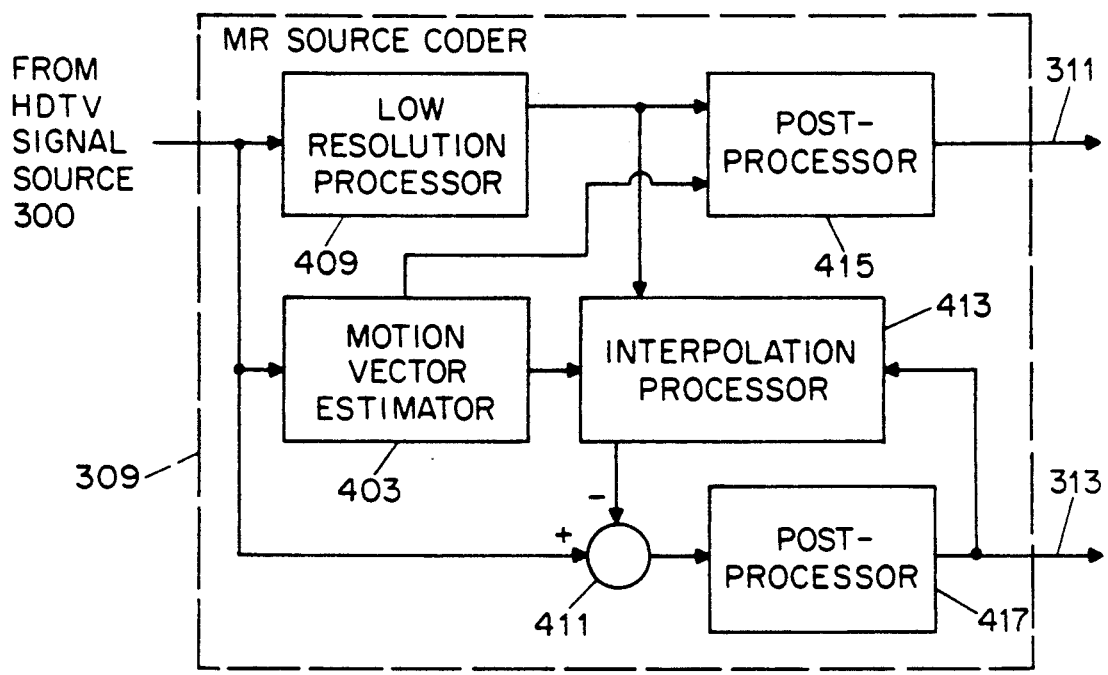
FIG. 4A is a block diagram of an MR source coder in the transmitter of FIG. 3.

FIG. 3 illustrates an exemplary transmitter 30 for the present broadcast system in accordance with the invention. In the transmitter 30, an HDTV signal source 300 typically comprises an HDTV camera 301 and a preprocessor 302. The camera 301 is used to capture video images and provides an RGB signal corresponding to those images to the preprocessor 302 wherein the signal is, in a standard way, anti-alias filtered, quantized, linearized, etc. The output of the HDTV signal source 300 is a bit stream representing TV picture frames at a rate of 60 Hz. By way of example, but not limitation, each picture frame is represented by 512 by 512 pixels and each pixel is represented by 16 bits. As such, the bit stream from the HDTV signal source 300 is at a rate of $60 \times 512 \times 512 \times 16 = 251.65824$ Mbits/second and is fed to an MR source coder 309. This coder implements a source decomposition scheme such as the one which is fully described in: K. Uz et al., "Interpolative Multiresolution Coding of Advanced Television with Compatible Subchannels," *IEEE Transactions on CAS for Video Technology, Special Issue on Signal Processing for Advanced Television*, vol. 1, pp. 86-99, March 1991. Referring to FIG. 4A, the bit stream from signal source 300 is received by a low resolution processor 409, a motion vector estimator 403 and a subtracter 411 within the MR source coder 309. The low resolution processor 409 derives a coarse representation of the TV picture frames from the incoming bit stream by performing thereon frame skipping, followed by spatial low-pass filtering and subsampling.

Figure 4B:
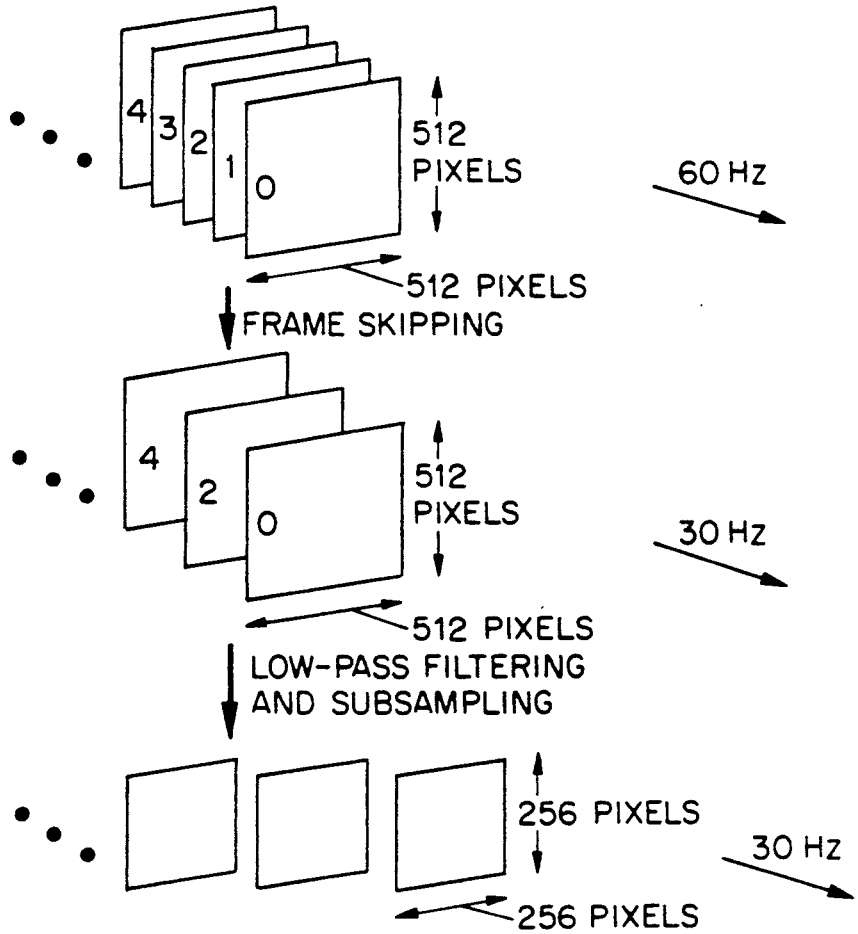
FIG. 4B describes certain processes performed in the MR source coder of FIG. 4A.

The frame skipping and subsampling processes are described in FIG. 4B. The bit stream received by the low resolution processor 409 are graphically depicted as picture frames of 512 by 512 pixels which are numerically denoted frames 0, 1, 2, 3, 4 . . . With the frame skipping process, the processor 409 retains the even-numbered frames. That is, only frames 0, 2, 4 . . . are further processed by the processor 409 at a rate of 30 Hz. After spatial low-pass filtering the even-numbered frames, the processor 409 subsamples the resulting frames by skipping every other pixel therein. As a result, the output frames from the low resolution processor 409 are 256 by 256 pixels generated at a rate of 30 Hz. Referring back to FIG. 4A, at the same time, the motion vector estimator 403, in a standard way, derives motion vectors indicating differences between a frame and its contiguous frames from the bit stream provided by the source 300. The output of the processor 409 and the motion vector information from estimator 403 are sent to a post-processor 415 which performs, on its input, processes including a standard motion compensated discrete cosine transform (DCT), followed by quantization and entropy coding, in accordance with the video coding scheme as established in: D. LeGall, "MPEG, a Video Compression for Multimedia Applications", *Transactions of ACM*, vol. 34, no. 4, pp. 46–58, April 1991. The output of the post-processor 415 appearing on lead 311 is a bit stream of 8 Mbits/second representing the motion vector information and coarse TV information for the coarse resolution service.

The output of the low resolution processor 409 is also fed back to the subtracter 411 through the interpolation processor 413. The latter predicts the original frames provided by the source 300 based on the subsampled, even-numbered frames from the processor 409. Specifically, the processor 413 performs on those frames spatial interpolation which first upsamples the frames by stuffing therein bits of 0 binary value to increase their frame size to 512 by 512 pixels. The enlarged frames are then interpolation-filtered to produce predicted versions of the original even-numbered frames. The processor 413 also produces predicted versions of the original odd-numbered frames through temporal interpolation based on (a) the predicted, even-numbered frames, (b) the motion vector information from the motion vector estimator 403 and (c) a bit stream from lead 313 to be described, which is fedback to the processor 413.

The processor 413 provides at an input of the subtracter 411 a signal representing the predicted versions of the original frames. With the signal representing the original frames at its other input, the subtracter 411 takes the difference between the two signals. The resulting difference signal is provided to a post-processor 417 which performs thereon processes including a DCT, followed by quantization and entropy encoding, in accordance with the video coding scheme as established in: "JPEG technical specification: Revision (DRAFT), Joint Photographic Experts group, ISO/IEC JTC1/SC2/WG8, CCITT SGVIII," August 1990. The output of the post-processor 417 appears on lead 313 and is a bit stream of 16 Mbits/second representing detailed TV information which, when combined with coarse TV information, provides the fine resolution service.

It should be noted at this point that the source decomposition scheme employed by the MR source coder 309 here is illustrative, and those skilled in the art will recognize that other known source decomposition schemes may be substituted for the one described here to suit particular applications.

Referring back to FIG. 3, during each transmission interval, which in this instance is 0.25 μs, the MR source coder 309 sends a bit-pair on to lead 311 and a 4-bit word onto lead 313. The bit-pair on lead 311 representing the coarse TV information and the motion vector information is hereinafter referred to as the coarse bit-pair", and the 4-bit word on lead 313 representing the detailed TV information is hereinafter referred to as the "detailed 4-bit word". Leads 311 and 313 extend to a channel coding section 307 which includes a multiplexer 315 and a channel coder 332. In a conventional manner, the multiplexer 315 multiplexes a coarse bit-pair with a detailed 4-bit word during each transmission interval. The resulting word is a 6-bit word appearing on lead 317 extending to the channel coder 332. This 6-bit word contains composite information for the fine resolution service to be provided to the first coverage area of radius Rf.

Figure 5:
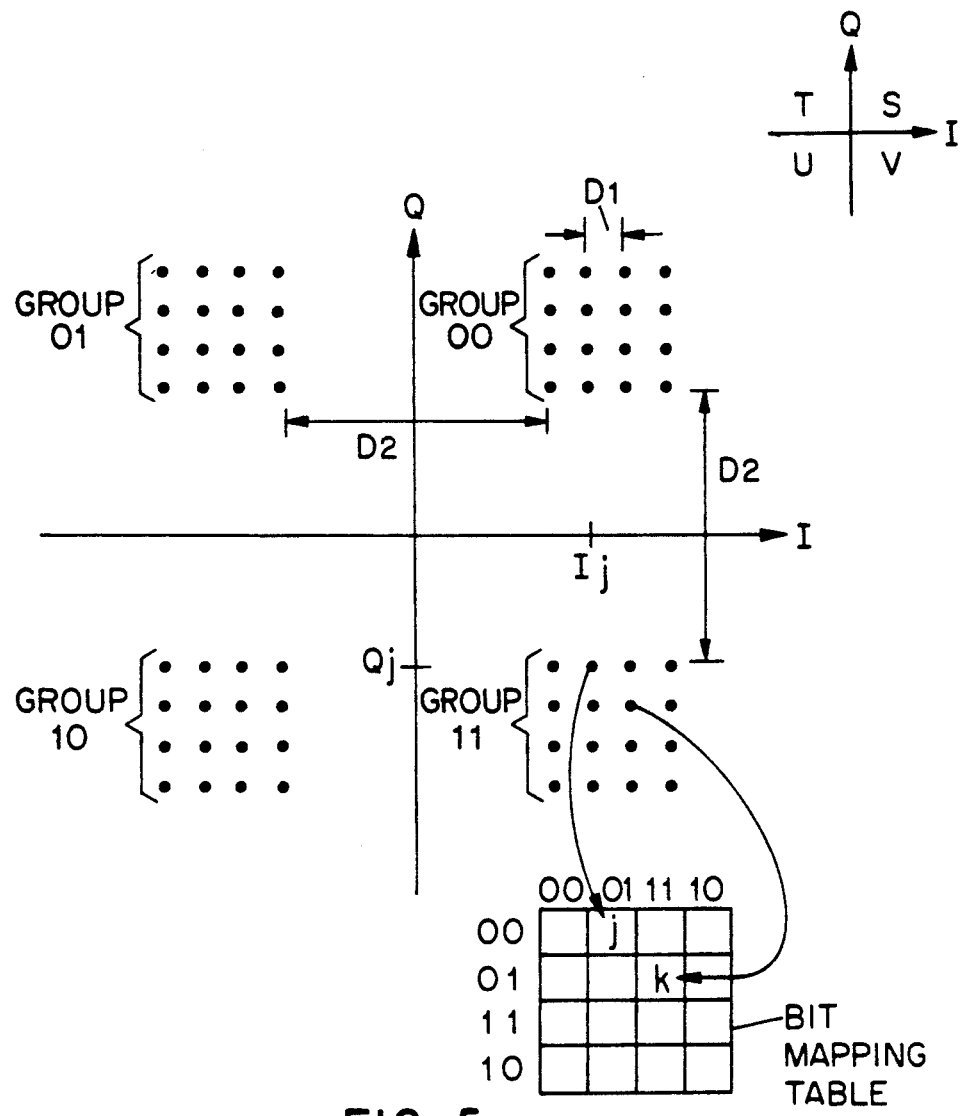
FIG. 5 is a signal constellation used in the digital T broadcast system in accordance with the invention.

One of the functions of the channel coder 332 is to select, in response to its input from lead 317, a signal point from a predetermined signal constellation pursuant to quadrature amplitude modulation (QAM) in accordance with the invention. FIG. 5 illustrates the signal constellation used in this particular embodiment. It contains 64 signal points disposed on a plane defined by an in-phase (I) axis and a quadrature-phase (Q) axis. As shown in FIG. 5, four quadrants are formed by the two axes and are alphabetically denoted S, T, U and V. In accordance with the invention, each of these quadrants includes a signal-point group of 16 signal points. Any two neighboring signal-point groups are separated by a distance D2, and any two neighboring signal points within a group are separated by a distance D1.

The selection of a particular signal point from the signal constellation of FIG. 5 by channel coder 332 may be performed, for example, by way of a table look-up. To this end, each of the four signal-point groups is associated with a bit pattern. In the present illustrative embodiment, the signal-point group in quadrant S is associated with the bit-pattern 00, the group in quadrant T with the bit-pattern 01, the group in quadrant U with the bit-pattern 10 and the group in quadrant V with the bit-pattern 11. Each of the 16 signal points within a signal-point group are further associated with one of the 16 4-bit patterns 0000 through 1111. The bit-mapping table in FIG. 5 illustrates a particular way to associate the signal points within, for example, the group identified by the bit pattern 11, with the respective bit patterns. In this bit-mapping table, each box corresponds to a signal point within group 11. This being so, the bit pattern associated with a particular signal point within group 11 is realized by reading off sequentially the bit-pairs identifying the row and column where the box corresponding to that particular signal point is. Thus, for example, a signal point j within group 11 is associated with the bit pattern 0001 and another signal point k within the same group is associated with the bit pattern 0111. Similarly, the signal points within every other group are each identified by one of the 16 4-bit patterns 0000 through 1111 within that group. Thus, each signal point in the constellation of FIG. 5 is uniquely identified by the associated bit pattern of its group and its associated bit pattern within that group.

Referring now back to FIG. 3, after receiving a 6-bit word from lead 317, the channel coder 332 selects a particular signal point in FIG. 5. Using a bit-pair in the received word, the channel coder 332 selects a particular one of the four signal-point groups 00, 01, 10 and 11 whose bit pattern matches such a bit-pair. In accordance with the invention, this bit-pair is identical to the previous coarse bit-pair on lead 311 representing the coarse TV information. Having selected the particular group, the channel coder 332 goes on to select the particular signal point within the selected group using the remaining four bits of the received 6-bit word. It should be noted that these four bits constitute the previous detailed 4-bit word on lead 313 representing the detailed TV information. The channel coder 332 selects the particular signal point within the selected group whose bit pattern matches those four bits. As an example, a 6-bit word of a binary value 110001 from lead 317 would cause channel coder 332 to select the signal point j, which is from group 11 and is associated with the bit pattern 0001 within that group.

Based on the foregoing discussion, the detailed design of the signal constellation for the present digital TV broadcast system will be apparent to those skilled in the art. In general, where a signal constellation is employed and no redundancy is introduced into the TV information, the ratio of the number of bits on lead 311 to the number of bits on lead 313 for each transmission interval equals the ratio of the logarithm of the number of identical signal-point groups in the signal constellation to that of the number of signal points within one such group. In the above example, the former ratio is 2:4 equal to 1:2, and the latter ratio is log 4:log 16 also equal to 1:2.

After selecting a particular signal point in response to the received six bit-word, the channel coder 332 generates a pair of signals representing the in-phase and quadrature-phase amplitudes corresponding to the selected signal point. The values of the in-phase and quadrature-phase components generated for the mth transmission interval are designated Im and Qm, respectively. For example, the channel coder 332 would generate in-phase and quadrature-phase components having values Im = Ij and Qm = −Qj when the signal point j of FIG. 5 is selected, where Ij and Qj are positive numbers.

The output of the channel coder 332 is applied to a modulator 341 wherein the inphase and quadrature-phase components are respectively processed by a transmit filter 351 and another transmit filter 353 for conventional pulse shaping. The resulting pulses from the transmit filters 351 and 353 are used to modulate a carrier of frequency Fc. To this end, these pulses are multiplied by $\cos(2\pi(Fc)t)$ and $\sin(2\pi(Fc)t)$ with a multiplier 359 and another multiplier 365, respectively. (In a conventional manner, t denotes cumulative time.) The resulting signals from the multipliers 359 and 365 are summed at an adder 369, which then generates a 2-dimensional double sideband quadrature carrier (DSB-QC) signal whose in-phase and quadrature-phase carriers have Im and Qm as their respective amplitudes. The DSB-QC signal, thus generated, is applied to a communication or broadcast channel.

The signal broadcast from the transmitter 30 is subject to corruption in the broadcast channel from various sources, such as Gaussian noise, phase jitter, frequency offset and intersymbol interference. As shown in FIG. 6A, the corrupted signal is received at a receiver 60 and applied to an analog interface 607 which includes an antialiasing filter (not shown) and an automatic gain control (AGC) circuit (not shown) of conventional design. The resulting signal is then applied to an analog-to-digital (A/D) converter 609 which provides digital samples to a bandpass filter/phase splitter 614. The latter provides two outputs on leads 615 and 616, these being a digital bandpass-filtered version of the A/D converter output and the Hilbert transform of same, respectively.

The signals on leads 615 and 616 are applied to an equalizer/demodulator 621. During each transmission interval, the equalizer/demodulator 621 provides, on to its output leads 622 and 623, a pair of baseband equalized signals which respectively represent the values of the inphase and quadrature-phase components of the received 2-dimensional DSB-QC signal currently being processed. Leads 622 and 623 extend to a channel decoding section 630 which includes a channel decoder 645 and a demultiplexer 655. Because, for example, the equalizer cannot perfectly compensate for all channel corruption, it remains to be determined from the outputs of the equalizer/demodulator 621 what the most likely transmitted signal point was. To this end, the channel decoder 645 receives the in-phase and quadrature-phase component values representing a received signal point and identifies, from the constellation of FIG. 5, a signal point which is closest (in Euclidean distance) to the received signal point. In this instance, this identification process however does not require computations of every Euclidean distance between the received signal point and each signal point in the constellation of FIG. 5. Rather, it requires (a) a determination of which quadrant or signal-point group of the constellation from which the transmitted signal point was most likely selected, and (b) a determination of which signal point within the group just determined is the signal point which was most likely transmitted. Step (a) is accomplished by checking the signs of the in-phase and quadrature-phase amplitudes associated with the received signal point. In this illustrative embodiment, it is determined that the received signal point originates from quadrant S or group 00 when both of the inphase and quadrature-phase amplitudes are positive in value (i.e., zero or larger), from quadrant T or group 01 when the in-phase amplitude value is negative and the quadrature-phase amplitude value is positive, from quadrant U or group 10 when both of the values are negative, and from quadrant V or group 11 when the in-phase amplitude value is positive and the quadrature-phase amplitude value is negative. Step (b) is accomplished, in a well-known manner, by identifying the closest signal point within the identified group in the constellation to the received signal point. Having identified the signal point most likely transmitted, the channel decoder 645 performs the inverse function to the channel coder 332 of the transmitter 30 by providing at its output a 6-bit word representing that signal point.

The channel decoder 645 provides the output word to a demultiplexer 655 which performs the inverse function to the multiplexer 315 of transmitter 30. That is, the demultiplexer 655 divides each 6-bit word it receives into the corresponding coarse bit-pair and detailed 4-bit word. The bit-pairs and the 4-bit words generated by the demultiplexer 655 ar applied to an MR source decoder 659 which performs the inverse function to the MR source coder 309 of the transmitter 30.

Figure 6B:
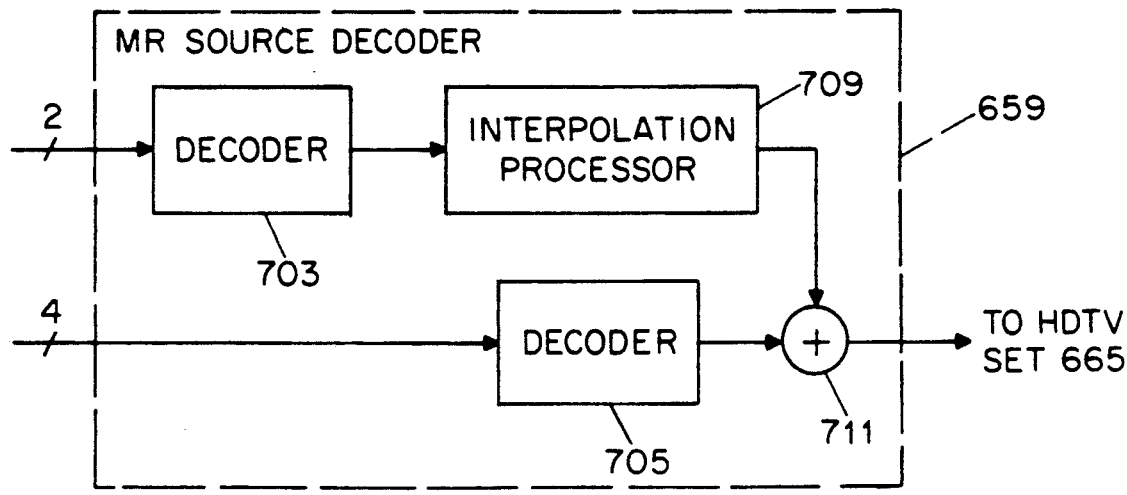
FIG. 6B is a block diagram of an MR source decoder in the receiver of FIG. 6A.
Figure 6A:
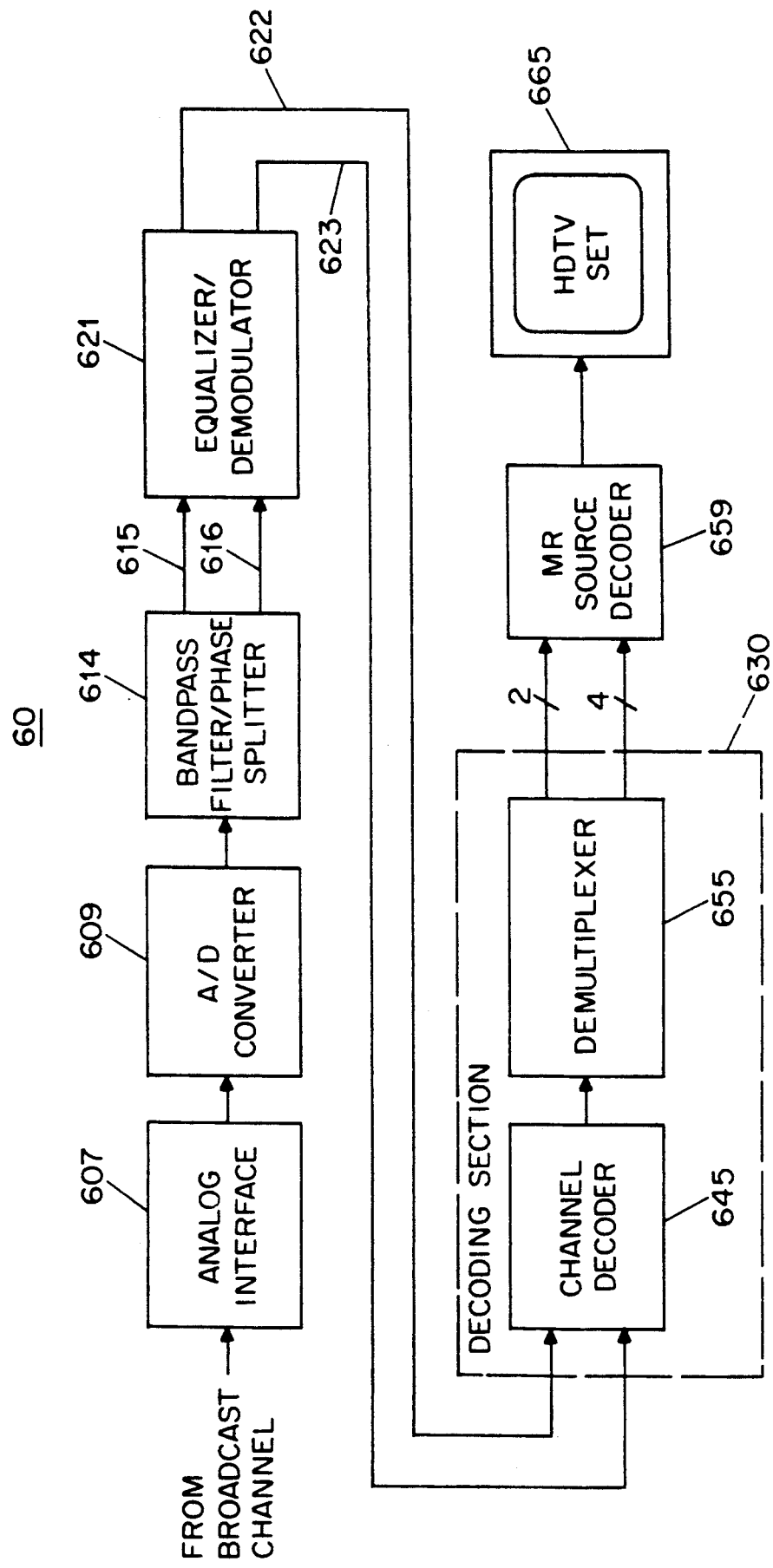
FIG. 6A is a block diagram of the receiver of the digital TV broadcast system in accordance with the invention.

FIG. 6B is a block diagram of the MR source decoder 659. As shown in FIG. 6B, the coarse bit-pair is fed to a decoder 703 which performs the inverse function to the post-processor 415 of FIG. 4A. The resulting signal is provided to an interpolation processor 709 which is structurally identical to the interpolation processor 413 as described hereinbefore. At the same time, the detailed 4-bit word is fed to a decoder 705 which performs the inverse function to the post-processor 417 of FIG. 4A. The individual outputs of the decoder 705 and the interpolation processor 709 are summed at an adder 711 whose output is a bit stream representing a series of TV picture frames from the HDTV source 300. Referring back to FIG. 6A, these frames are provided to a conventional HDTV set 665 to recreate the broadcast pictures on its screen.

It should be noted at this juncture that the transmitter 30 broadcasts video signals for reception by any number of receivers having the above-described characteristics of the receiver 60. As mentioned before, the coarse bit-pair representing the coarse TV information is used to select a particular one of the four signal-point groups in the constellation of FIG. 5, while the detailed 4-bit word representing the detailed TV information is used to select one of the 16 signal points within the selected group. As explained in detail hereinbelow, the lengths of the radii Rf and Rc can be manipulated, and those receivers within the radius Rf of the transmitter 30 would manage to recover both the transmitted coarse bit-pairs and the detailed 4-bit words, and would thereby be provided with a fine resolution service. On the other hand, stemming from lower CNR's of received signals due to their farther distance from the transmitter 30, those receivers between the radius Rf and the radius Rc of the transmitter 30 would only manage to recover the transmitted coarse bit-pairs, and would thereby still be provided with an acceptable, coarse resolution service. In addition, those receivers beyond the radius Rc of the transmitter 30 would manage to recover neither the transmitted coarse bit-pairs nor detailed 4-bit words, and would thus receive a poor or no TV service.

Since the receivers between the radius Rf and the radius R of the transmitter 30 would only receive the coarse resolution service, their design can be much simplified relative to that of the receiver 60, stemming from the fact that these receivers need not identify the actual signal point which was transmitted but rather need to identify the signal-point group from which the transmitted signal point originated. With this in mind, in designing the simplified receiver, one can treat the signal constellation referenced thereby as if it had only four signal points which, although much bigger in size, represent the respective signal-point groups. FIG. 7A depicts such a signal constellation. As shown in FIG. 7A, each of the four shaded squares is deemed a signal point and any two neighboring signal points are separated by the distance D2. Thus, as far as the simplified receiver is concerned, the present modulation scheme is reduced to one of 4-QAM.

FIG. 7B illustrates the simplified receiver which is numerically denoted 70. The above-described 2-dimensional DSB-QC signal broadcast by the transmitter 30 is received by a pre-processing section 751 within the receiver. The section 751 comprises an analog interface (not shown), an A/D converter (not shown), and a bandpass filter/phase splitter (not shown) which are structurally identical to the analog interface 607, the A/D converter 609 and the bandpass filter/phase splitter 614 of FIG. 6A, respectively. Thus, the pre-processing section 751 provides, on lead 753, a signal identical to that on lead 615 of receiver 60 and, on lead 754, another signal identical to that on lead 616 of same. The signals on the respective leads 753 and 754 are applied to a demodulator 755. During each transmission interval, the demodulator 755 provides, on to its output leads 761 and 763, a pair of baseband signals which respectively represent the values of the inphase and quadrature-phase components of the received 2-dimensional DSB-QC signal currently being processed. From leads 761 and 763, a channel decoder 769 receives the inphase and quadrature-phase component values representing a received signal point. The decoder 769 identifies, from the constellation of FIG. 7A, a signal point which is closest (in Euclidean distance) to the received signal point. Alternatively, in this instance the channel decoder 769 simply determines which quadrant or signal-point group of the constellation of FIG. 5 from which the transmitted signal point was most likely selected. Having determined the signal-point group in question, the channel decoder 769 outputs a bit-pair identifying that signal point group. This bit-pair is a coarse bit-pair containing the coarse TV information and the motion vector information as described before. The coarse bit-pair is further processed by a source decoder 773 structurally identical to the decoder 703 of FIG. 6B. Among other things, the source decoder 773 performs, on its input, motion compensation, and inverse functions to entropy coding, quantization and DCT. The output of the source decoder 773 is a series of picture frames of 256 by 256 pixels. Based on these picture frames, a digital TV set 779 recreates the broadcast pictures on its screen, thereby providing the coarse resolution service. It is noteworthy that, unlike the HDTV set 665 of receiver 60 requiring a screen resolution of 512 by 512 pixels, the digital TV set 779 here only requires a screen resolution of 256 by 256 pixels and is thus simpler in design and less expensive.

In accordance with the invention, the relative length of Rf to Rc can be manipulated by varying the ratio of D1 (distance between two neighboring signal points within a signal-point group) to D2 (distance between two neighboring signal-point groups) of FIG. 5. As is well known, where noise immunity of a signal is relatively high, a receiver can accurately recover the signal despite a relatively low CNR when the signal is received. Referring back to FIG. 5, the noise immunity associated with a particular signal point in the constellation increases with the distance between that signal point and its neighboring signal points, which is D1. Similarly, the noise immunity associated with a particular signal-point group increases with the distance between that group and its neighboring groups, which is D2. Theoretically, D1 and D2 can be made so large that the transmitted signal point and the signal-information point group from which it is selected can be accurately identified through the received signal despite its very low CNR. However, in reality D1 and D2 are limited by a fixed transmitter power so as not to interfere with other transmitters close by. Since the transmitter power is normally fixed, an increase in D1 necessarily entails a decrease in D2, and vice versa.

In view of the foregoing, in order to ensure delivery of any of the coarse and fine resolution services, it is necessary that the coarse bit-pairs be accurately recovered. To this end, D2 is always made larger than D1 in the present embodiment to provide more noise immunity to a signal-point group identified by a coarse-bit pair than to a signal point within a group, which is identified by a detailed 4-bit word. That is, the ratio of D1 to D2, which is denoted L, is always made smaller than 1 but greater than 0. (It can be shown that if $L=1$, i.e., $D1=D2$, the present system will revert to a single resolution system offering only the fine resolution service, while if $L=0$, i.e., $D1=0$, the present system will revert to a single resolution system offering only the coarse resolution service.) By now, it should be apparent to a person skilled in the art that the relative length of Rf to Rc can be changed by varying the parameter L. For example, an increase in D2 causes an increase in the noise immunity of signal-point groups identified by coarse bit-pairs. This results in a longer Rc, beyond which the coarse bit-pairs become unrecoverable due to the CNR of the received signal being too low. Concomitantly, the increase in D2 entails a decrease in D1 which decreases the noise immunity of signal points within a signal-point group, which are identified by detailed 4-bit words. This results in a shorter Rf, beyond which the detailed 4-bit words become unrecoverable. In short, the ratio of Rf to Rc is a function of and varies directly with L. For illustrative purposes, FIG. 8 tabulates exemplary ratios of Rf to Rc corresponding to various values of L, which are found in an experiment where an additive-white-Gaussian-noise (AWGN) broadcast channel is assumed. Indeed, as shown in FIG. 8, L increases with the ratio of Rf to Rc.

In order to increase reliability of the fine resolution service over the demanding broadcast channel and to increase its coverage area, it may be desirable to further encode the TV information using a convolutional code. As is well known, convolutional codes deploying a Euclidean distance metric can achieve better performance for the same complexity than the more commonly used block error correcting codes. One such convolutional code is known as a "trellis code" as established in: G. Ungerboeck, "Channel Coding with Multilevel/Phase Signals," *IEEE Transactions on Information Theory*, vol. IT-28, pp. 55-67, January 1982. In accordance with another aspect of the invention, trellis coded modulation involving the trellis code may be employed by a digital TV broadcast system to provide therewith a so-called "coding gain" which manifests itself in the form of enhanced immunity to such random channel impairments as additive noise, without sacrificing the source bit rate or requiring additional broadcast bandwidth.

Figure 12:
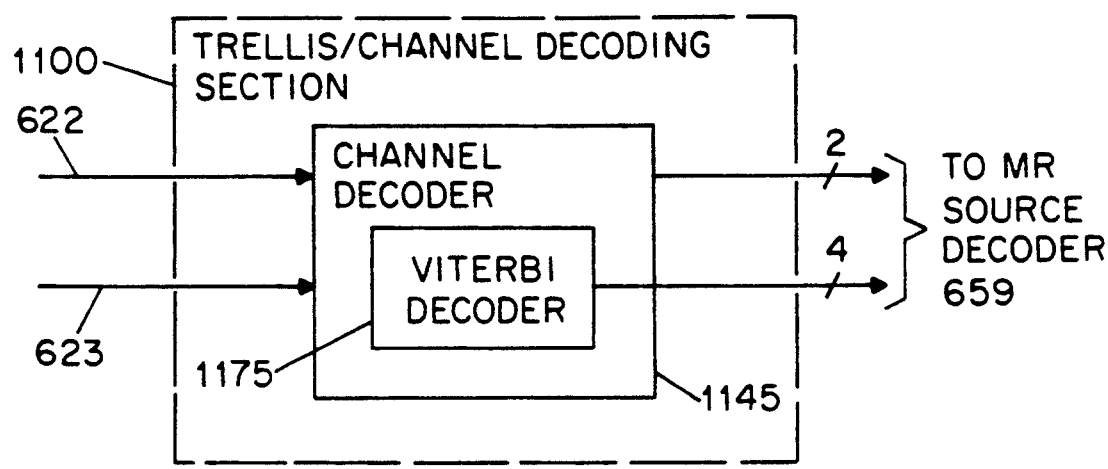
FIG. 12 is a block diagram of a decoding section incorporating a Viterbi decoder which is used by the receiver of FIG. 6A when the transmitter of FIG. 3 incorporates the trellis coded modulation.

The incorporation of trellis coded modulation into the above-described digital TV broadcast system is accomplished by replacing (a) the channel coding section 307 of transmitter 30 with a trellis/channel coding section 800, as shown in FIG. 9, and (b) the channel decoding section 630 of the receiver 60 with a trellis/channel decoding section 1100, as shown in FIG. 12. The operation of the trellis/channel coding section 800 and the trellis/channel decoding section 1100 will be fully described below. Thus, in an exemplary digital TV broadcast system that employs the trellis coded modulation, the trellis/channel coding section 800 of FIG. 9, including a trellis encoder 818 and a channel coder 830, takes in the aforementioned coarse bit-pairs and detailed 4-bit words on leads 311 and 313, respectively.

The trellis encoder 818 is a systematic four state encoder of conventional design which introduces redundancy into a signal set to allow the use of the maximum likelihood decoding technique at the receiver. This redundancy takes the form of an additional bit. Thus, after taking in a detailed four-bit word on lead 313, the trellis encoder 818, in a known way, generates a 5-bit trellis coded word.

In the present trellis coding arrangement, as in other trellis coding arrangements generally, the signal points of the signal constellation associated with trellis coding need to be partitioned into subsets. FIG. 10 illustrates one such signal constellation having four subsets, namely, a, b, c, and d. The boundary of this illustrative constellation is defined by the dashed line. As shown in FIG. 10, the constellation is cruciform in shape and contains 32 signal points. Each signal point is labelled to indicate to which one of the four subsets it belongs. A closer look at FIG. 10 reveals that each subset has eight signal points. Any two neighboring signal points are separated by a distance D3.

The 5-bit word generated by the trellis encoder 818 identifies a particular signal point within the constellation of FIG. 10. In a conventional manner, two bits of the 5-bit word identify a particular one of the four subsets from which the particular signal point is to come. The remaining three bits identify the particular one of the eight signal points within the identified subset.

The coarse bit-pair on lead 311 and the 5-bit word from the trellis encoder 818 are applied at the input of the channel coder 830 which, like channel coder 332 of FIG. 3, selects, in response to the input, a signal point from another signal constellation used for transmitting video signals. FIG. 11 illustrates such a signal constellation used in the present system implementing the trellis coded modulation. This signal constellation is similar to the signal constellation of FIG. 5 in that they both contain four signal-point groups, each of which is separated by the distance D2 from its neighboring groups. However, in this instance, each of the four signal-point groups in FIG. 11 is identical to the constellation of FIG. 10. Alternatively stated, each signal-point group here is a translated version of the constellation of FIG. 10. Although each signal-point group of FIG. 11 is conveniently represented by the boundary defining the constellation of FIG. 10, it is understood that, within each boundary, there are 32 signal points identically arranged to those in FIG. 10 and, for simplicity of the depiction, these signal points are omitted here.

In order to meet the same fixed power limitation of the transmitter 30 as before, it can be shown that D3 (distance between two neighboring signal points within a signal-point group of the constellation of FIG. 11) would be shorter than D1 by a factor of $\sqrt{2}$. Although this seems to lower the noise immunity of signal points within a group in FIG. 11 due to the shorter distance from their neighboring signal points, the system overall benefits from the coding gain introduced by the trellis coded modulation. In fact, the digital TV broadcast system with trellis coded modulation using a 4-state trellis code, as here, requires a lower CNR at its receiver than the system without by a factor of 3 dB. This translates to an increase in Rf by a factor of $\sqrt{2}$. In addition, it can be shown that, with an error-concealment to be described, it is not necessary for the present trellis coded modulation to employ a trellis code of higher than 4 states to achieve the desired result. Thus, without the necessity of the use of a higher state trellis code, the complexity of circuitry implementing the trellis coded modulation can advantageously be kept minimal.

Referring now back to FIG. 9, with the signal constellation of FIG. 11, the channel coder 830 uses the coarse bit-pair on lead 311 to select, as before, a particular one of the four signal-point groups from which the transmitted signal point is to be obtained Moreover, it uses the 5-bit word from the encoder 818 to select a particular signal point within the selected signal-point group, which is a translated version of the constellation of FIG. 10, in the manner described hereinbefore. The output of the channel coder 830 is a pair of signals representing the in-phase and quadrature-phase amplitudes corresponding to the selected signal point whose values are respectively designated Im and Qm, as described before.

The trellis/channel decoding section 1100 of FIG. 12 will now be described. It comprises a channel decoder 1145 including a Viterbi decoder 1175. As a substitution for the channel decoding section 630 of FIG. 6A, the section 1100 receives from leads 622 and 623, the aforementioned pair of baseband equalized signals which respectively represent the values of the in-phase and quadrature-phase components of the received signal point being processed. In the manner described hereinbefore, the channel decoder 1145 first identifies which signal-point group from which the transmitted signal point was most likely selected. The channel coder 1145 thereupon generates the coarse bit-pair representing the identified signal-point group. Thereafter referring to the translated version of the constellation of FIG. 10 corresponding to the identified signal-point group and using the well-known Viterbi algorithm, the Viterbi decoder 1175 makes the "maximum likelihood" decision as to what signal point was transmitted. In particular, among other things, the Viterbi algorithm identifies a signal point from each of the subsets of the constellation of FIG. 10. Such a signal point is identified to be the closest (in Euclidean distance) of all other signal points within its subset to the received signal point. Details on the Viterbi Algorithm can be found in: G. Forney, "The Viterbi Algorithm," *Proceeding of the IEEE*, vol. 761, pp. 268-278, March, 1973.

The Viterbi decoder 1175 generates the 5-bit word resulting from the maximum likelihood decision and drops the redundancy bit therefrom. The output of the Viterbi decoder 1175 is thus a detailed 4-bit word. This 4-bit word, together with the aforementioned coarse bit-pair, is sent from the trellis/channel decoding section 1100 to the MR source decoder 659 of the receiver 60 as described before.

The foregoing merely illustrates the principles of the invention. It will thus be appreciated that those skilled in the art will be able to devise various modifications or alterations which, although different from the exemplary embodiments described herein, are within the scope as defined by the appended claims.

For example, the signal-point group can be of virtually any type of constellation geometry, including those which are other than rectilinear (e.g. circular) and/or more than two dimensions.

In addition, it may be desirable to packetize the aforementioned 6-bit word so as to enclose it with, for example, a header and a trailer of predetermined bit patterns for synchronization purposes.

Moreover, the implementation of the present multiresolution scheme is not limited to the particular bit rate employed in the exemplary embodiments. Rather, based on the discussion heretofore, a person skilled in the art can readily adapt the illustrative scheme to whatever bit rate the HDTV standard may require.

Figure 13A:
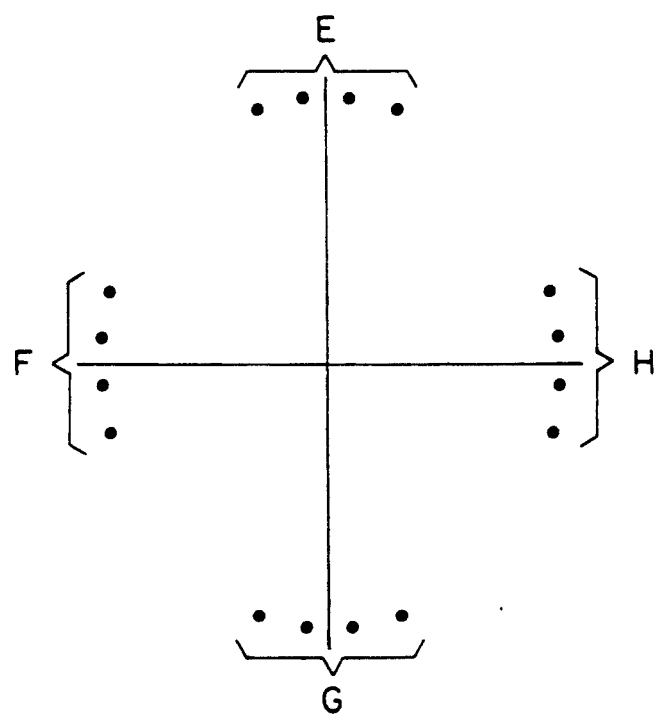
FIGS. 13A and 13B are two other illustrative signal constellations which can be used by the digital TV broadcast system in accordance with the invention.
Figure 13B:

Furthermore, the invention can be used equally well in block or other types of coding applications as well as with various types of modulation other than QAM as here. These modulation schemes may be, for example, phase shift keying (PSK), pulse amplitude modulation (PAM), etc. Although such modulation schemes may be termed differently, they are de facto variants of QAM and are anticipated by the present, broad invention where they involve the use of a signal constellation having signal-point groups, each including a multiplicity of signal points, and the interdistance of the signal-point groups is larger than that of the signal points within one such group. For example, two of the myriad of signal constellations contemplated by the present invention are illustrated in FIGS. 13A and 13B. FIG. 13A shows a signal constellation used in PSK. As shown in FIG. 13A, this signal constellation contains four signal-point groups alphabetically denoted E, F, G and H, and each group further includes four signal points. FIG. 13B shows a signal constellation used in PAM. As shown in FIG. 13B, this constellation contains two signal-point groups alphabetically denoted X and Y, and each group further includes two signal points.

Further, the MR source decoder 659 in the present digital TV broadcast system may employ an error concealment scheme to mask transmission error and to provide moderately degrading pictures in case of erroneous transmission. An example of the error concealment scheme using a technique of replacing the erroneous portion of the present frame with the corresponding portion of the previous frame, which is motion compensated based on the received motion vector information, is described in: K. Ramchandran et al., "Multiresolution Broadcast for Digital HDTV Using Joint Source Channel Coding," Center for Telecommunication Research, Columbia University, CU/CTR/TR 290-91-72, December 1991, which is hereby incorporated by reference. The effectiveness of such an error concealment scheme depends upon the robustness of the motion vector information communicated from the transmitter to the receiver. This required robustness is well achieved here due to the present design of the joint source/channel coding scheme wherein the MR source coder 659 generates the coarse bit-pair including the motion vector information, which is channel coded in such a way that it is accorded relatively high noise immunity, compared with the detailed 4-bit word.

Although the present exemplary embodiments employ a two-resolution scheme, it is appreciated that a person skilled in the art can readily derive, from the present scheme, other schemes offering more than two resolutions. Illustratively, in a three resolution scheme, the MR source coder would be required to decompose the incoming picture frames into three levels of details, rather than the present two levels, thus resulting in an intermediate level of TV information represented by a subset of bits other than the coarse bit-pair in the aforementioned 6-bit word. The transmission of the three levels of TV information can be achieved by further dividing each signal-point group of FIG. 5 into subgroups of signal points wherein any two neighboring subgroups are separated by a third distance other than D1 and D2, and each subgroup within a group represents the intermediate TV information.

Figure 13C:
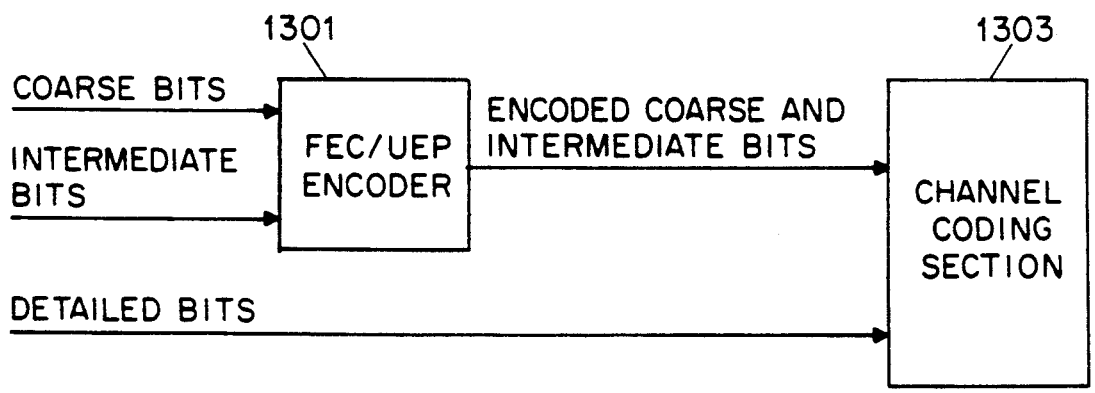
FIG. 13C is a block diagram of signal processing devices for achieving three or more different TV service qualities using a forward error correction code with unequal error protection in accordance with the invention.

An alternative to the above-described three resolution scheme is to utilize forward error correction (FEC) coding with unequal error protection (UEP), combined with QAM similar to the present modulation scheme. For the details on the FEC code with UEP, one can refer to: Kasami et al., "Coding for the Binary Symmetric Broadcast Channel with Two Receivers," *IEEE Transactions on Information Theory*, vol. IT-31, no. 5, pp. 616-625, September 1985; and Lin et al., "Computer Search for Binary Cyclic UEP Codes of Odd Length Up to 65," *IEEE Transactions on Information Theory*, vol. 36, no. 4, pp. 924-935, July 1990. This alternative three resolution scheme is based on the inventive notion that different degrees of robustness, e.g., noise immunity, are provided to the coarse, intermediate and detailed TV information to yield three different resolutions. Turning now to FIG. 13C, in accordance with this scheme, only the coarse and intermediate TV information are FEC coded in such a way that the coarse information is better protected than the intermediate information. That is, both "coarse" bits representing the coarse TV information and "intermediate" bits representing the intermediate TV information are FEC coded by a conventional FEC/UEP encoder 1301 in such a way that the coarse bits, when received, would have lower error probabilities than the intermediate bits. As such, the FEC code with UEP provides a protective differential between the coarse and intermediate bits. The introduction of QAM provides another protective differential between "detailed" bits representing the detailed TV information and the aggregate of the coarse bits and the intermediate bits. To this end, the encoded coarse bits together with the intermediate bits are fed to a channel coding section 1303 similar to the channel coding section 307 and are used to select a particular signal-point group in a signal constellation and the detailed bits are also fed to the channel coding section 1303 and are used to select a particular signal point within the selected signal-point group. Based on the discussion heretofore, it is appreciated that a person skilled in the art can readily devise other multiresolution systems by combining the techniques of QAM and the FEC coding with UEP.

Figure 14:
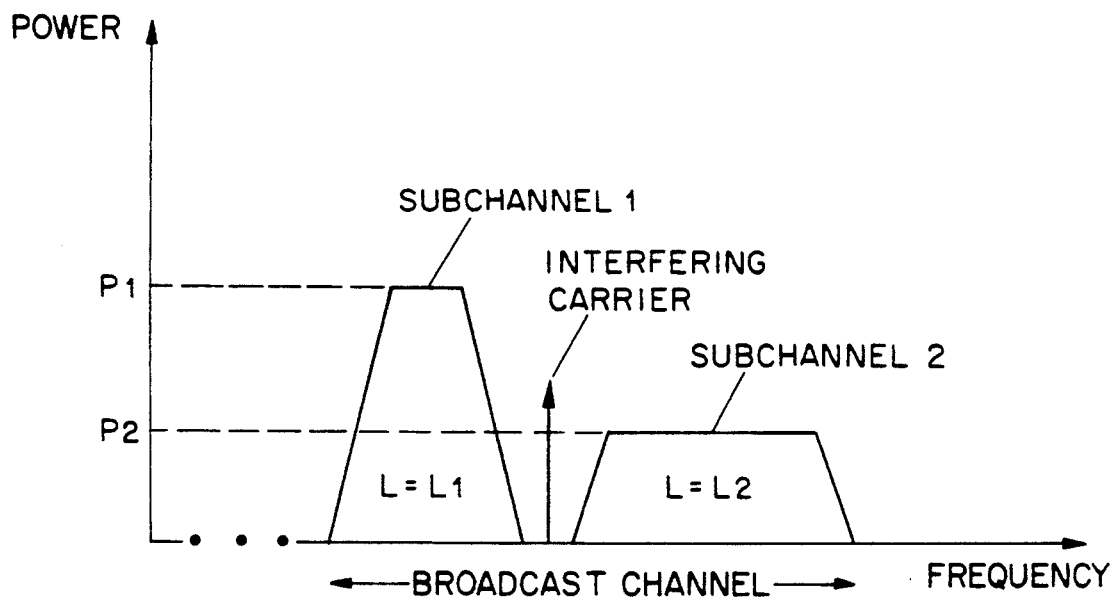
FIG. 14 is a spectral diagram illustrating a frequency division multiplexed arrangement in which two individual subchannels each implement an embedded tworesolution scheme in accordance with the invention.
Figure 15:
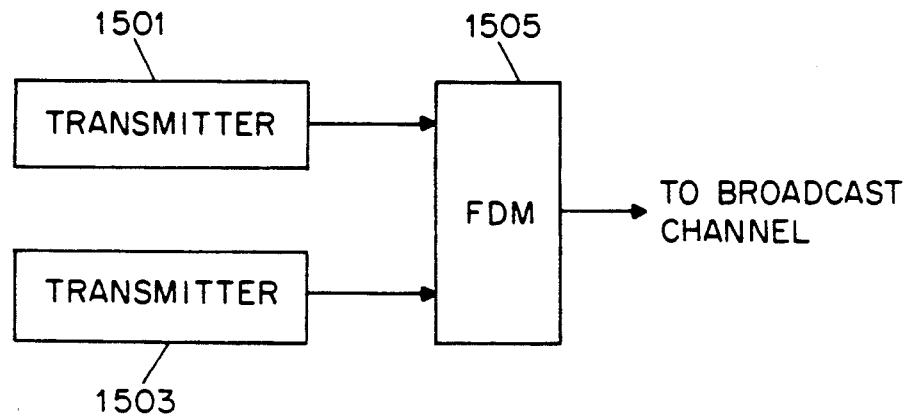
FIG. 15 is a block diagram of signal processing devices for achieving three or more different TV service qualities using a frequency division multiplexed scheme in accordance with the invention.

Other schemes affording three or more resolutions may be achieved by combining a frequency division multiplexed scheme with QAM similar to the present modulation scheme. Referring to FIG. 14 and FIG. 15, the broadcast channel may be divided into subchannel 1 and subchannel 2 which occupy different bandwidths. Such subdivision may be necessary to avoid interference from a nearby interfering carrier. In subchannel 1, first and second resolutions can be achieved by using a transmitter 1501 similar to the transmitter 30 implementing a QAM scheme characterized by a signal constellation, similar to the one of FIG. 5, having L equal to L1 and the power allocated to that subchannel equal to P1. On the other hand, in subchannel 2, third and fourth resolutions can be achieved by using another transmitter 1503 also similar to transmitter 30 implementing another QAM scheme characterized by another signal constellation, also similar to the one of FIG. 5, having L equal to L2 and the power equal to P2. In general, by frequency division multiplexing the two subchannels using a conventional frequency division multiplexer (FDM) 1505, a four resolution scheme results. However, if L1 and L2 are matched, this will result in another three resolution scheme.

Finally, the exemplary embodiments of the invention are disclosed herein in a form in which the various signal processing functions are performed by discrete functional blocks. These functional blocks may be implemented in various ways and combinations using logic circuitry and/or appropriately programmed processors, as will be known to those skilled in the art.

We claim:

1. Apparatus for transmitting signals representing digital images in at least two resolutions including a relatively fine resolution and a relatively coarse resolution, said apparatus comprising:

means for providing a sequence of digital images;

means for processing said sequence of digital images to provide at least a relatively fine resolution version and a relatively coarse resolution version thereof;

first means for selecting signal points from a signal constellation having a plurality of signal-point groups, each signal-point group comprising a plurality of signal points which are disposed within the signal-point group in a particular pattern, said signal-point groups being translated versions of one another in said signal constellation, any two neighboring signal points being separated by at least a first distance, at least one signal point within each signal-point group having more than two neighboring signal points separated from said at least one signal point by said first distance, signal points selected by said first means representing said relatively fine resolution version of said digital images, said first means including second means for selecting signal-point groups from which said signal points selected by said first means originate, signal-point groups selected by said second means representing said relatively coarse resolution version of said digital images; and means for transmitting signals representing said signal points selected by said first means, said first distance being shorter than a second distance between any two neighboring signal-point groups in said signal constellation, a ratio of said first distance to said second distance being pre-selected so that said relatively fine resolution versions are recoverable when said signals are receive within a first radius of said apparatus and said relatively coarse resolution versions are recoverable when said signals are received between said first radius and a second radius of said apparatus, said first radius being shorter than said second radius.

2. The apparatus of claim 1 wherein the processing means includes third means for generating first words each having a first number of bits, said third means including fourth means for generating second words each having a second number of bits, each first word being inclusive of a second word, said first means selecting a particular signal point in response to a first word, and said second means selecting the signal-point group from which said particular signal point is selected in response to a second word which is included in said first word.

3. The apparatus of claim 2 wherein a difference between said first number and said second number is a third number, and a ratio of said second number to said third number equals a ratio of the logarithm of the number of said signal-point groups to the logarithm of the number of said signal points in one such signal-point group.

4. The apparatus of claim 2 further comprising means for encoding each first word with an error correcting code.

5. The apparatus of claim 4 wherein said error correcting code is a convolutional code.

6. The apparatus of claim 5 wherein said convolutional code is a trellis code.

7. The apparatus of claim 1 wherein said ratio of said first distance to said second distance is greater than zero but smaller than one.

8. The apparatus of claim 1 wherein the processing means includes means for subsampling and skipping every other digital images.

9. The apparatus of claim 1 wherein the processing means including means for providing motion information indicating differences between a previously processed digital image and a digital image being currently processed.

10. The apparatus of claim 9 wherein said signal-point groups selected by said second means also represent said motion information.

11. The apparatus of claim 2 wherein said second words are encoded using a forward error correction (FEC) code with unequal error protection (UEP) so that a subset of bits in each second word are more protected from being erred during recovery thereof than the bits other than said subset of bits in the second word, said subset of bits representing at least a third resolution version of said digital images other than said relatively coarse resolution version and said relatively fine resolution version.

12. The apparatus of claim 1 further comprising means for transmitting second signals representing at least a third resolution version of said digital images other than said relatively coarse resolution version and said relatively fine resolution version, said second signals being frequency division multiplexed with said signals.

13. Receiver apparatus for receiving signals representing digital images of at least two resolutions including a relatively fine resolution and a relatively coarse resolution, said receiver apparatus comprising:
  means for receiving signals representing signal points which were selected from a signal constellation in a transmitter apparatus, said signal constellation having a plurality of signal-point groups, each signal point group comprising a plurality of signal points which are disposed within the signal-point group in a particular pattern, said signal-point groups being translated versions of one another in said signal constellation, any two neighboring signal points being separated by at least a first distance, at least one signal point within each signal-point group having more than two neighboring signal points separated from said at least one signal point by said first distance;
  first means responsive to said signals for identifying said signal points which were selected, the selected signal points representing said digital images in said relatively fine resolution, said first means including second means for identifying said signal-point groups from which said selected signal points originate, said signal-point groups representing said digital images in said relatively coarse resolution, said first distance being shorter than a second distance between any two neighboring signal-point groups in said signal constellation, a ratio of said first distance to said second distance being pre-selected so that said selected signal points are identifiable by said receiver apparatus within a first radius of said transmitter apparatus and only said signal-point groups are identifiable by said receiver apparatus between said first radius and a second radius of said transmitter apparatus, said first radius being shorter than said second radius.

14. The receiver apparatus of claim 13 further comprising third means for identifying a first word comprising a first number of bits corresponding to a signal point selected in said transmitter apparatus, said third means including fourth means for identifying a second word comprising a second number of bits corresponding to a signal-point group from which said signal point selected in said transmitter apparatus originates.

15. The receiver apparatus of claim 14 wherein said first number is larger than said second number and said first word is inclusive of said second word.

16. The receiver apparatus of claim 14 wherein a difference between said first number and said second number is a third number, and a ratio of said second number to said third number equals a ratio of the logarithm of the number of said signal-point groups to the logarithm of the number of said signal points in one such signal-point group.

17. The receiver apparatus of claim 14 wherein said first word is encoded with an error correcting code.

18. The receiver apparatus of claim 17 wherein said error correcting code is a convolution code.

19. The receiver apparatus of claim 18 wherein said convolution code is a trellis code.

20. The receiver apparatus of claim 19 further comprising means for decoding said trellis code in accordance with a Viterbi algorithm.

21. The receiver apparatus of claim 13 wherein said ratio is greater than zero but smaller than one.

22. A system for broadcasting signals representing digital images in at least two resolutions including a relatively fine resolution and a relatively coarse resolution, said system comprising:
  transmitter apparatus comprising
  means for providing a sequence of digital images;
  means for processing said sequence of digital images to provide at least a relatively fine resolution version and a relatively coarse resolution version thereof;
  first means for selecting signal points from a signal constellation having a plurality of signal-point groups, each signal-point group comprising a plurality of signal points which are disposed within the signal-point group in a particular pattern, said signal-point groups being translated versions of one another in said signal constellation, any two neighboring signal points being separated by at least a first distance, at least one signal point within each signal-point group having more than two neighboring signal points separated from said at least one signal point by said first distance, signal points selected by said first means representing said relatively fine resolution version of said digital images, said first means including second means for selecting signal-point groups from which said signal points selected by said first means originate, signal-point groups selected by said second means representing said relatively coarse resolution version of said digital images; and
  means for transmitting signals representing said signal points selected by said first means, said first distance being shorter than a second distance between any two neighboring signal-point groups in said signal constellation, a ratio of said first distance to said second distance being pre-selected so that said relatively fine resolution versions are recoverable when said signals are received within a first radius of said transmitter apparatus and said relatively coarse resolution versions are recoverable when said signals are received between said first radius and a second radius of said transmitter apparatus, said first radius being shorter than said second radius; and
  receiver apparatus comprising
  means for receiving said signals; and
  means responsive to said signals for recovering said digital images of at least said relatively coarse resolution.

23. The system of claim 22 wherein said recovering means is capable of receiving said digital images of said relatively fine resolution within said first radius.

24. The system of claim 22 wherein the processing means includes third means for generating first words each having a first number of bits, said third means including fourth means for generating second words each having a second number of bits, each first word being inclusive of a second word, said first means selecting a particular signal point in response to a first word, and said second means selecting the signal-point group from which said particular signal point is selected in response to a second word which is included in said first word.

25. The system of claim 24 wherein a difference between said first number and said second number is a third number, and a ratio of said second number to said third number equals a ratio of the logarithm of the number of said signal-point groups to the logarithm of the number of said signal points in one such signal-point group.

26. The system of claim 24 further comprising means for encoding each first word with an error correcting code.

27. The system of claim 26 wherein said error correcting code is a convolutional code.

28. The system of claim 27 wherein said convolutional code is a trellis code.

29. The system of claim 22 wherein said ratio of said first distance to said second distance is greater than zero but smaller than one.

30. The system of claim 22 wherein the processing means includes means for subsampling and skipping every other said digital images.

31. The system of claim 22 wherein the processing means including means for providing motion information indicating differences between a previously processed digital image and a digital image being currently processed.

32. The system of claim 31 wherein said signal-point groups selected by said second means also represent said motion information.

33. The system of claim 24 wherein said second words are encoded using a forward error correction (FEC) code with unequal error protection (UEP) so that a subset of bits in each second word are more protected from being erred during recovery thereof than the bits other than said subset of bits in the second word, said subset of bits representing at least a third resolution version of said digital images other than said relatively coarse resolution version and said relatively fine resolution version.

34. The system of claim 22 further comprising means for transmitting second signals representing at least a third resolution version of said digital images other than said relatively coarse resolution version and said relatively fine resolution version, and said second signals being frequency division multiplexed with said signals.

* * * * *

UNITED STATES PATENT AND TRADEMARK OFFICE
CERTIFICATE OF CORRECTION

PATENT NO. : 5,267,021
DATED : November 30, 1993
INVENTOR(S) : Kannan Ramchandran et al.

It is certified that error appears in the above-identified patent and that said Letters Patent is hereby corrected as shown below:

Col. 1, line 12, "in the are" should read -- in the area --; line 14, "each been" should read -- has been --; line 50, "ar" should read -- are --. Col. 2, line 4, "to be" should read -- is --. Col. 3, line 5, "T" should read -- TV --; line 45, "tworeso-" should read -- two-reso- --. Col. 9, line 22, "radius R" should read -- radius Rc --. Col. 16, line 56, "other" should read -- other said --; line 58, "including" should read -- includes --. Col. 18, line 4, "convolution" should read -- convolutional --; line 6, "convolution" should read -- convolutional --. Col. 20, line 5, "including" should read -- includes --.

Signed and Sealed this

Eighteenth Day of October, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,267,021
DATED : November 30, 1993
INVENTOR(S) : Kannan Ramchandran et al.

It is certified that error appears in the above-indentified patent and that said Letters Patent is hereby corrected as shown below:

Col. 1, before line 5, insert --The United States Government has certain rights in this invention pursuant to award CDR-881111 by the National Science Foundation.--

Signed and Sealed this

Fourteenth Day of May, 1996

Attest:

BRUCE LEHMAN

*Attesting Officer*    *Commissioner of Patents and Trademarks*